United States Patent
Croney et al.

(10) Patent No.: US 7,574,653 B2
(45) Date of Patent: Aug. 11, 2009

(54) ADAPTIVE IMAGE FORMATTING CONTROL

(75) Inventors: Joseph Keith Croney, Kirkland, WA (US); Greg David Schechter, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 169 days.

(21) Appl. No.: 10/269,072

(22) Filed: Oct. 11, 2002

(65) Prior Publication Data

US 2004/0073873 A1   Apr. 15, 2004

(51) Int. Cl.
*G06F 17/00* (2006.01)

(52) U.S. Cl. .................. 715/249; 715/273; 715/205; 709/228; 345/428; 345/660

(58) Field of Classification Search .......... 715/526, 715/735, 523, 513, 501.1, 794, 205, 234, 715/249, 273; 709/219, 228, 246; 345/428, 345/660
See application file for complete search history.

(56) References Cited

U.S. PATENT DOCUMENTS

| | | | |
|---|---|---|---|
| 3,937,925 A | 2/1976 | Boothroyd | |
| 3,956,615 A | 5/1976 | Anderson et al. | |
| 4,186,871 A | 2/1980 | Anderson et al. | |
| 4,807,154 A | 2/1989 | Scully et al. | |
| 4,847,785 A | 7/1989 | Stephens | |
| 4,949,300 A | 8/1990 | Christenson et al. | |
| 4,979,148 A | 12/1990 | Bush et al. | |
| 5,093,778 A | 3/1992 | Favor et al. | 712/340 |
| 5,299,315 A | 3/1994 | Chin et al. | |
| 5,349,657 A | 9/1994 | Lee | |
| 5,388,156 A | 2/1995 | Blackledge, Jr. et al. | |
| 5,434,992 A | 7/1995 | Mattson | 711/119 |
| 5,465,332 A | 11/1995 | Deloye et al. | |
| 5,471,318 A | 11/1995 | Ahuja et al. | |
| 5,517,655 A | 5/1996 | Collins et al. | |
| 5,548,340 A | 8/1996 | Bertram | |
| 5,550,560 A | 8/1996 | Kanada et al. | |
| 5,604,908 A | 2/1997 | Mortson | |
| 5,608,890 A | 3/1997 | Berger et al. | 711/113 |
| 5,638,176 A | 6/1997 | Hobbs et al. | |

(Continued)

FOREIGN PATENT DOCUMENTS

EP   01111679 A2   12/2000

(Continued)

OTHER PUBLICATIONS

Solomon, David A. "Inside Windows NT, Second Edition"; Microsoft Press 1998; pp. 310-319.

(Continued)

*Primary Examiner*—Doug Hutton
*Assistant Examiner*—James H Blackwell
(74) *Attorney, Agent, or Firm*—Merchant & Gould P.C.

(57) ABSTRACT

A method for rendering images for display on a client device is provided. A single image may be stored on the server for conversion into an image suitable for display on a particular client device. Image conversion may be performed consistent with the display capabilities of the client device. The display capabilities of the particular device requesting access to a web page may be identified at the time the web page is requested. Converted images may be stored and made available upon request.

49 Claims, 7 Drawing Sheets

U.S. PATENT DOCUMENTS

| | | | |
|---|---|---|---|
| 5,640,449 A | 6/1997 | Worley et al. | |
| 5,649,131 A | 7/1997 | Ackerman et al. | 715/744 |
| 5,664,228 A | 9/1997 | Mital | |
| 5,675,520 A | 10/1997 | Pitt, III et al. | |
| 5,706,505 A | 1/1998 | Fraley et al. | |
| 5,727,159 A * | 3/1998 | Kikinis | 709/246 |
| 5,732,256 A | 3/1998 | Smith | |
| 5,732,267 A | 3/1998 | Smith | |
| 5,745,103 A | 4/1998 | Smith | |
| 5,748,890 A | 5/1998 | Goldberg et al. | |
| 5,754,774 A | 5/1998 | Bittinger et al. | 709/203 |
| 5,764,235 A * | 6/1998 | Hunt et al. | 345/428 |
| 5,764,236 A | 6/1998 | Tanaka | |
| 5,764,873 A | 6/1998 | Magid et al. | |
| 5,774,670 A | 6/1998 | Montulli | |
| 5,793,982 A | 8/1998 | Shrader et al. | |
| 5,802,600 A | 9/1998 | Smith et al. | 711/173 |
| 5,812,996 A | 9/1998 | Rubin et al. | |
| 5,835,724 A | 11/1998 | Smith | |
| 5,855,020 A | 12/1998 | Kirsch | |
| 5,878,141 A | 3/1999 | Daly et al. | |
| 5,878,282 A | 3/1999 | Mital | |
| 5,892,937 A | 4/1999 | Caccavale | 711/135 |
| 5,897,622 A | 4/1999 | Blinn et al. | |
| 5,897,644 A * | 4/1999 | Nielsen | 715/513 |
| 5,911,068 A | 6/1999 | Zimmerman et al. | |
| 5,911,145 A | 6/1999 | Arora et al. | 715/514 |
| 5,918,007 A | 6/1999 | Blackledge, Jr. et al. | |
| 5,935,207 A | 8/1999 | Logue et al. | 709/219 |
| 5,940,075 A | 8/1999 | Mutschler, III et al. | |
| 5,940,847 A | 8/1999 | Fein et al. | |
| 5,953,524 A | 9/1999 | Meng et al. | |
| 5,956,489 A | 9/1999 | San Andres et al. | |
| 5,961,601 A | 10/1999 | Iyengar | |
| 5,963,952 A | 10/1999 | Smith | |
| 5,974,430 A | 10/1999 | Mutschler, III et al. | 715/505 |
| 5,983,227 A | 11/1999 | Nazem et al. | |
| 5,991,802 A | 11/1999 | Allard et al. | |
| 5,995,753 A | 11/1999 | Walker | 717/108 |
| 6,006,230 A | 12/1999 | Ludwug et al. | |
| 6,014,637 A | 1/2000 | Fell et al. | |
| 6,014,666 A | 1/2000 | Helland et al. | |
| 6,023,714 A * | 2/2000 | Hill et al. | 715/513 |
| 6,032,207 A | 2/2000 | Wilson | |
| 6,038,551 A | 3/2000 | Barlow et al. | |
| 6,059,913 A | 5/2000 | Martin et al. | |
| 6,067,578 A | 5/2000 | Zimmerman et al. | |
| 6,072,664 A | 6/2000 | Aoyagi et al. | |
| 6,076,108 A | 6/2000 | Courts et al. | |
| 6,101,607 A | 8/2000 | Bachand et al. | |
| 6,108,717 A | 8/2000 | Kimura et al. | |
| 6,115,744 A | 9/2000 | Robins | |
| 6,119,078 A * | 9/2000 | Kobayakawa et al. | 704/3 |
| 6,119,115 A | 9/2000 | Barr | |
| 6,119,155 A | 9/2000 | Rossman et al. | |
| 6,121,968 A | 9/2000 | Arcuri et al. | |
| 6,122,637 A | 9/2000 | Yohe et al. | |
| 6,128,623 A | 10/2000 | Mattis et al. | |
| 6,138,150 A | 10/2000 | Nichols et al. | |
| 6,138,171 A | 10/2000 | Walker | |
| 6,151,624 A | 11/2000 | Teare et al. | |
| 6,167,438 A | 12/2000 | Yates et al. | |
| 6,167,441 A | 12/2000 | Himmel | |
| 6,167,524 A | 12/2000 | Goodnow et al. | |
| 6,173,316 B1 | 1/2001 | De Boor et al. | |
| 6,178,461 B1 | 1/2001 | Chan et al. | |
| 6,185,608 B1 | 2/2001 | Hon et al. | |
| 6,185,625 B1 * | 2/2001 | Tso et al. | 709/247 |
| 6,202,199 B1 | 3/2001 | Wygodny et al. | |
| 6,203,220 B1 | 3/2001 | Takenoshita et al. | |
| 6,205,480 B1 | 3/2001 | Broadhurst et al. | |
| 6,212,192 B1 | 4/2001 | Mirashrafi et al. | |
| 6,218,958 B1 | 4/2001 | Eichstaedt et al. | |
| 6,230,160 B1 | 5/2001 | Chan et al. | |
| 6,230,313 B1 | 5/2001 | Callahan et al. | |
| 6,246,422 B1 | 6/2001 | Emberling et al. | |
| 6,247,044 B1 | 6/2001 | Gosling et al. | |
| 6,249,844 B1 | 6/2001 | Schloss et al. | |
| 6,253,228 B1 | 6/2001 | Ferris et al. | |
| 6,253,234 B1 | 6/2001 | Hunt et al. | |
| 6,279,151 B1 | 8/2001 | Breslau et al. | |
| 6,286,133 B1 | 9/2001 | Hopkins | |
| 6,297,819 B1 | 10/2001 | Furst | |
| 6,300,947 B1 * | 10/2001 | Kanevsky | 715/866 |
| 6,311,215 B1 * | 10/2001 | Bakshi et al. | 709/221 |
| 6,326,957 B1 | 12/2001 | Nathan et al. | |
| 6,334,126 B1 * | 12/2001 | Nagatomo et al. | 707/4 |
| 6,334,157 B1 | 12/2001 | Oppermann et al. | |
| 6,343,148 B2 | 1/2002 | Nagy | |
| 6,345,279 B1 * | 2/2002 | Li et al. | 707/104.1 |
| 6,351,767 B1 | 2/2002 | Batchelder et al. | |
| 6,353,447 B1 | 3/2002 | Truluck et al. | |
| 6,354,477 B1 | 3/2002 | Trummer | |
| 6,363,352 B1 | 3/2002 | Dailey et al. | |
| 6,370,561 B1 | 4/2002 | Allard et al. | |
| 6,373,841 B1 | 4/2002 | Goh et al. | |
| 6,384,846 B1 * | 5/2002 | Hiroi | 715/794 |
| 6,397,253 B1 | 5/2002 | Quinlan et al. | |
| 6,401,099 B1 | 6/2002 | Koppulu et al. | |
| 6,401,132 B1 | 6/2002 | Bellwood et al. | |
| 6,405,241 B2 | 6/2002 | Gosling et al. | |
| 6,412,008 B1 | 6/2002 | Fields et al. | |
| 6,421,717 B1 * | 7/2002 | Kloba et al. | 709/219 |
| 6,421,733 B1 * | 7/2002 | Tso et al. | 709/246 |
| 6,424,981 B1 | 7/2002 | Isaac et al. | |
| 6,426,761 B1 * | 7/2002 | Kanevsky et al. | 715/788 |
| 6,430,575 B1 | 8/2002 | Dourish et al. | |
| 6,438,576 B1 | 8/2002 | Huang et al. | |
| 6,457,030 B1 * | 9/2002 | Adams et al. | 715/523 |
| 6,460,071 B1 | 10/2002 | Hoffman | |
| 6,460,141 B1 | 10/2002 | Olden | |
| 6,463,442 B1 | 10/2002 | Bent et al. | |
| 6,466,203 B2 * | 10/2002 | Van Ee | 345/173 |
| 6,470,381 B2 | 10/2002 | De Boor et al. | |
| 6,473,609 B1 | 10/2002 | Schwartz et al. | |
| 6,480,894 B1 | 11/2002 | Courts et al. | |
| 6,487,665 B1 | 11/2002 | Andrews et al. | |
| 6,496,692 B1 * | 12/2002 | Shanahan | 455/418 |
| 6,505,238 B1 | 1/2003 | Tran | |
| 6,509,913 B2 | 1/2003 | Martin et al. | |
| 6,514,095 B1 | 2/2003 | Smith et al. | |
| 6,535,896 B2 * | 3/2003 | Britton et al. | 715/523 |
| 6,539,421 B1 | 3/2003 | Appelman et al. | |
| 6,539,501 B1 | 3/2003 | Edwards | |
| 6,542,908 B1 | 4/2003 | Ims | |
| 6,542,967 B1 | 4/2003 | Major | |
| 6,546,473 B2 | 4/2003 | Cherkasova et al. | |
| 6,546,516 B1 | 4/2003 | Wright et al. | |
| 6,556,217 B1 * | 4/2003 | Makipaa et al. | 345/667 |
| 6,557,038 B1 | 4/2003 | Becker et al. | |
| 6,560,598 B2 | 5/2003 | Delo et al. | |
| 6,560,618 B1 | 5/2003 | Ims | |
| 6,560,639 B1 | 5/2003 | Dan et al. | |
| 6,563,517 B1 * | 5/2003 | Bhagwat et al. | 715/735 |
| 6,563,913 B1 * | 5/2003 | Kaghazian | 379/93.24 |
| 6,564,251 B2 | 5/2003 | Katariya et al. | |
| 6,591,272 B1 | 7/2003 | Williams | |
| 6,593,944 B1 * | 7/2003 | Nicolas et al. | 715/744 |
| 6,606,418 B2 | 8/2003 | Mitchell et al. | |
| 6,610,105 B1 | 8/2003 | Martin et al. | |
| 6,622,168 B1 | 9/2003 | Datta | |
| 6,633,416 B1 | 10/2003 | Benson | |
| 6,643,712 B1 | 11/2003 | Shaw et al. | |
| 6,678,518 B2 * | 1/2004 | Eerola | 455/422.1 |

| | | |
|---|---|---|
| 6,687,735 B1 | 2/2004 | Logston et al. |
| 6,697,825 B1 * | 2/2004 | Underwood et al. ........ 715/530 |
| 6,704,024 B2 | 3/2004 | Robotham et al. |
| 6,704,728 B1 | 3/2004 | Chang et al. |
| 6,714,794 B1 | 3/2004 | O'Carroll |
| 6,725,219 B2 | 4/2004 | Nelson et al. |
| 6,728,421 B2 | 4/2004 | Kokemohr |
| 6,732,364 B1 | 5/2004 | Bhaskaran et al. |
| 6,757,708 B1 | 6/2004 | Craig et al. |
| 6,757,899 B2 | 6/2004 | Zhdankin et al. |
| 6,757,900 B1 | 6/2004 | Burd et al. |
| 6,772,408 B1 | 8/2004 | Velonis et al. |
| 6,782,403 B1 * | 8/2004 | Kino et al. ................. 707/203 |
| 6,789,105 B2 | 9/2004 | Ludwig et al. |
| 6,792,575 B1 * | 9/2004 | Samaniego et al. ......... 715/513 |
| 6,792,605 B1 | 9/2004 | Roberts et al. |
| 6,792,607 B1 | 9/2004 | Burd et al. |
| 6,826,597 B1 | 11/2004 | Lonnroth et al. |
| 6,832,263 B2 | 12/2004 | Polizzi et al. |
| 6,834,297 B1 * | 12/2004 | Peiffer et al. ................ 709/219 |
| 6,847,333 B2 * | 1/2005 | Bokhour .................... 345/1.1 |
| 6,886,013 B1 | 4/2005 | Beranek |
| 6,892,226 B1 | 5/2005 | Tso et al. |
| 6,901,437 B1 | 5/2005 | Li |
| 6,904,600 B1 | 6/2005 | James et al. |
| 6,915,307 B1 | 7/2005 | Mattis et al. |
| 6,915,454 B1 | 7/2005 | Moore et al. |
| 6,918,107 B2 | 7/2005 | Lucas et al. |
| 6,920,480 B2 | 7/2005 | Mitchell et al. |
| 6,922,827 B2 | 7/2005 | Vasilik et al. |
| 6,928,488 B1 | 8/2005 | De Jong et al. |
| 6,944,797 B1 | 9/2005 | Guthrie et al. |
| 6,948,174 B2 | 9/2005 | Chiang et al. |
| 6,950,875 B1 | 9/2005 | Slaughter et al. |
| 6,954,751 B2 | 10/2005 | Christfort et al. |
| 6,954,854 B1 | 10/2005 | Miura et al. |
| 6,961,750 B1 | 11/2005 | Burd |
| 6,961,754 B2 * | 11/2005 | Christopoulos et al. ..... 709/204 |
| 6,961,776 B1 | 11/2005 | Buckingham et al. |
| 6,964,009 B2 * | 11/2005 | Samaniego et al. ....... 715/501.1 |
| 6,990,653 B1 | 1/2006 | Burd et al. |
| 7,013,340 B1 | 3/2006 | Burd et al. |
| 7,016,963 B1 * | 3/2006 | Judd et al. .................. 709/228 |
| 7,076,786 B2 | 7/2006 | Burd et al. |
| 7,099,870 B2 | 8/2006 | Hsu et al. |
| 7,117,504 B2 | 10/2006 | Smith et al. |
| 7,159,007 B2 | 1/2007 | Stawikowski |
| 7,162,723 B2 | 1/2007 | Guthrie et al. |
| 7,171,443 B2 | 1/2007 | Tiemann et al. |
| 7,171,454 B2 | 1/2007 | Nguyen |
| 7,181,731 B2 | 2/2007 | Pace et al. |
| 7,188,112 B1 | 3/2007 | Lindquist et al. |
| 7,188,155 B2 | 3/2007 | Flurry et al. |
| 7,216,294 B2 | 5/2007 | Gibbs et al. |
| 7,380,250 B2 | 5/2008 | Schechter et al. |
| 7,428,725 B2 | 9/2008 | Niyogi et al. |
| 2001/0013070 A1 * | 8/2001 | Sasaki ........................ 709/246 |
| 2001/0027474 A1 | 10/2001 | Nachman et al. |
| 2001/0037404 A1 | 11/2001 | Hafsteinsson et al. |
| 2001/0047385 A1 | 11/2001 | Tuatini |
| 2001/0054020 A1 | 12/2001 | Barth et al. |
| 2002/0004815 A1 | 1/2002 | Muhlestein et al. |
| 2002/0008703 A1 | 1/2002 | Merrill et al. |
| 2002/0056085 A1 * | 5/2002 | Fahraeus ....................... 725/1 |
| 2002/0062396 A1 * | 5/2002 | Kakei et al. ................. 709/246 |
| 2002/0073163 A1 * | 6/2002 | Churchill et al. ............. 709/214 |
| 2002/0078101 A1 | 6/2002 | Chang et al. |
| 2002/0078144 A1 | 6/2002 | Lamkin et al. |
| 2002/0083171 A1 | 6/2002 | Hoogenboom et al. |
| 2002/0095445 A1 | 7/2002 | alSafadi et al. |
| 2002/0107891 A1 * | 8/2002 | Leamon et al. ............. 707/513 |
| 2002/0108102 A1 | 8/2002 | Muhlestein et al. |
| 2002/0116534 A1 | 8/2002 | Teeple |
| 2002/0120677 A1 | 8/2002 | Goward et al. |
| 2002/0120753 A1 * | 8/2002 | Levanon et al. ............. 709/228 |
| 2002/0129016 A1 * | 9/2002 | Christfort et al. ............... 707/6 |
| 2002/0133635 A1 | 9/2002 | Schechter et al. |
| 2002/0138331 A1 | 9/2002 | Hosea et al. |
| 2002/0152244 A1 | 10/2002 | Dean et al. |
| 2002/0161928 A1 | 10/2002 | Ndili .......................... 709/246 |
| 2002/0161938 A1 * | 10/2002 | Bonomo et al. ................. 710/5 |
| 2002/0188890 A1 | 12/2002 | Shupps et al. |
| 2002/0194227 A1 * | 12/2002 | Day et al. .................... 707/523 |
| 2003/0004998 A1 | 1/2003 | Datta |
| 2003/0009476 A1 | 1/2003 | Fomenko et al. |
| 2003/0009519 A1 | 1/2003 | Gosling et al. |
| 2003/0009567 A1 | 1/2003 | Farouk |
| 2003/0018827 A1 | 1/2003 | Gutherie et al. |
| 2003/0025728 A1 | 2/2003 | Ebbo et al. |
| 2003/0028565 A1 | 2/2003 | Landsman et al. |
| 2003/0028892 A1 | 2/2003 | Gewickey et al. |
| 2003/0066056 A1 | 4/2003 | Peterson et al. |
| 2003/0074634 A1 | 4/2003 | Emmelmann |
| 2003/0097639 A1 | 5/2003 | Niyogi et al. |
| 2003/0110234 A1 | 6/2003 | Egli et al. |
| 2003/0187952 A1 | 10/2003 | Young et al. |
| 2003/0204622 A1 | 10/2003 | Blizniak et al. |
| 2003/0233477 A1 | 12/2003 | Ballinger et al. |
| 2004/0003112 A1 | 1/2004 | Alles et al. |
| 2004/0003117 A1 * | 1/2004 | McCoy et al. ................ 709/246 |
| 2004/0003139 A1 | 1/2004 | Cottrille et al. |
| 2004/0003248 A1 | 1/2004 | Arkhipov |
| 2004/0012627 A1 * | 1/2004 | Zakharia et al. ............. 345/744 |
| 2004/0015879 A1 | 1/2004 | Pauw et al. |
| 2004/0030740 A1 | 2/2004 | Stelting |
| 2004/0073873 A1 | 4/2004 | Croney et al. |
| 2004/0172484 A1 * | 9/2004 | Hafsteinsson et al. ........ 709/246 |
| 2004/0218045 A1 | 11/2004 | Bodnar et al. |
| 2004/0230958 A1 | 11/2004 | Alauf |
| 2005/0091230 A1 | 4/2005 | Ebbo et al. |
| 2005/0138560 A1 | 6/2005 | Lee et al. |
| 2005/0171967 A1 | 8/2005 | Yuknewicz |
| 2005/0193097 A1 | 9/2005 | Guthrie et al. |
| 2005/0229186 A1 | 10/2005 | Mitchell et al. |
| 2005/0251380 A1 | 11/2005 | Calvert et al. |
| 2005/0256834 A1 | 11/2005 | Millington et al. |
| 2005/0256924 A1 | 11/2005 | Chory et al. |
| 2005/0256933 A1 | 11/2005 | Millington et al. |
| 2005/0257138 A1 | 11/2005 | Chory et al. |
| 2005/0268292 A1 | 12/2005 | Ebbo et al. |
| 2005/0278351 A1 | 12/2005 | Niyogi et al. |
| 2006/0004910 A1 | 1/2006 | Burd et al. |
| 2006/0020883 A1 | 1/2006 | Kothari et al. |
| 2006/0112336 A1 | 5/2006 | Gewickey et al. |
| 2006/0130038 A1 | 6/2006 | Claussen et al. |
| 2007/0005795 A1 | 1/2007 | Gonzalez |
| 2007/0033533 A1 | 2/2007 | Sull |
| 2007/0174845 A1 | 7/2007 | Guthrie et al. |

FOREIGN PATENT DOCUMENTS

| | | |
|---|---|---|
| EP | 1156415 | 11/2001 |
| EP | 1156427 | 11/2001 |
| EP | 1156428 | 11/2001 |
| EP | 1156429 | 11/2001 |
| EP | 1164473 | 12/2001 |
| EP | 1241593 | 7/2006 |
| GB | 2339374 A | 1/2000 |
| JP | 11-98134 | 4/1999 |
| JP | 2002-24079 | 1/2002 |
| JP | 2002-41299 | 2/2002 |
| JP | 2002-49484 | 2/2002 |
| JP | 2002-49585 | 2/2002 |
| WO | WO 98/21651 | 5/1998 |
| WO | WO 98/44695 | 10/1998 |
| WO | WO 99/34288 | 7/1999 |

| | | |
|---|---|---|
| WO | WO 01/27783 | 4/2001 |
| WO | WO 01/75667 | 10/2001 |
| WO | WO 02/21343 | 3/2002 |

OTHER PUBLICATIONS

Dobson, Rick; "Data Binding in Dynamic HTML"; DBMS Mar. 1998 pp. 47-52.

Custer, Helen; "Inside Windows NT"; Microsoft Press 1993; pp. 74-81.

Esposito, Dino; "Heaven Sent"; Developer Network Journal issue 23 Mar./Apr. 2001 pp. 18-24.

Kitayama, Fumihiko; Hirose, Shin-Ichi; Kondoh, Goh; Kuse, Kazushi; "Design of a Framework for Dynamic Content Adaptation to Web-Enabled Terminals and Enterprise Applications"; IEEE 1999, pp. 72-79.

Ingham; David B; "W3Objects: A Distributed Object-Oriented Web Server" Object-Oriented Web Servers and data Modeling Workshop, Sixth International World Wide Web Conference, Apr. 7, 1997, Santa Clara, CA 4 pages.

Davulcu, Hasan; Freire, Juliana; Kifer, Michael; Ramakrishnan, I.V.; "A Layered Architecture for Querying Dynamic Web Content"; ACM 1999; pp. 491-502.

"OOP Launches Hammock at JavaOne" http://www.oop.com/pr2000_06_08.jsp?gui=Plain Jun. 8, 2000, 1 page.

"Hammock: Think of it as Swing for the Web"; Jul. 14, 2000; 10 pages.

Hammond, Eric "Hammock Swings through Web interfaces" www.infoworld.com/articles/mt/xml/00/07/17/000717mthammock.xml; Jul. 14, 2000; 3 pages.

Duan, Nick N.; "Distributed Database Access in a Corporate Environment Using Java" Bell Atlantic Corporation; 1996; 8 pages.

Frost, Jim; "Windows NT Security"; May 4, 1995; 7 pages; http://world.std.com/~jimf/papers/pt-security/nl-security.html.

Developing ASP-Based Applications: Microsoft 1996, 5 pages.

"ColdFusion: Web Application Server"; Allair Corp; www.allair.com; 1995-1999; 28 pages.

"Alterego Networks Introduces First Mobile Web Server for Enterprises, Telcos and Providers"; Redwood City, CA; Nov. 14, 2000; 3 pages.

"Bluestone Software Layes Foundation for Internet Operating Environment with Total-E-Server . . . " Screaming Media, Business Wire; Jun. 5, 2000; 3 pages.

Stewart, Tony; "The Document as Application: Issues and Implications" GCA XML Europe 1999; pp. 575-599.

Franklin, Keith; "Supercharge Data Binding"; Visual Basic Programmer's Journal, Mar. 2000; 7 pages.

Shapiro, Marc; "A Binding Protocol for Distributed Shared Objects" Presented at 14th International Conference on Distributed Comp. Sys.; Jun. 21-24, 1994; 17 pages.

Anderson, Richard; Homer, Alex; Howard, Rob; Sussman, Dave; "A Preview of Active Server Pages+"; Copyright 2000, Wrox Press, pp. 1-73.

"HTML Encyclopaedia"; http://www.scit.wlv.ac.uk/encyc/form.html; 1995-1998 2 pages.

Marshall, James; "HTTP Made Really Easy: A Practical Guide to Writing Clients and Servers"; Aug. 15, 1997; 14 pages.

Chapter 3, "Mechanics of Developing JavaScript Applications"; Server-Side Javascript Guide; Online! 1999; pp. 51-108 www.developer.netscape.com/docs/mauals/ssjs/1_4/ssjs.pdf.

Chapter 6, "Session Mangement Service"; Server Side Javascript Guide; Online! 1999 pp. 125-166 www.developer.netscape.com/docs/manuals/ssjs/1_4/ssjs.pdf.

"A Brief History of Hypertext" Microsoft Corporation, 1996, 1 page.

European Search Report 01111678.7-2201.

European Search Report 01111680.3-2201.

European Search Report 01111681.1-2201.

European Search Report 01111682.9-2201.

Nadamoto, A., et al., "WebCarousel: Restructuring Web Search Results for Passive Viewing in Mobile Environments," Proceedings on Seventh International Conference on Database Systems for Advanced Applications : Hong Kong, SAR, China, Apr. 18-21, 2001, pp. 164-165.

Wu, D., et al., "Scalable Video Transport over Wireless IP Networks," $11^{th}$ IEEE International Symposium on Personal, Indoor and Mobile Radio Communications (PIMRC 2000), London, UK, Sep. 18-21, 2000, pp. 1185-1191.

Penn, G., et al., "Flexible Web Document Analysis for Delivery to Narrow-Bandwidth Devices," Proceedings on Sixth International Conference on Document Analysis and Recognition, Seattle, WA, Sep. 10-13, 2001, pp. 1074-1078.

Kunz, T., et al., "Image Transcoding for Wireless WWW Access: The User Perspective," Proceedings of SPIE, vol. 4673 (2002), pp. 28-33.

Hovanes, M., et al., "Seamless Multiresolution Display of Portable Wavelet-Compressed Images," J. of Digital Imaging, vol. 12, No. 2, Supp. 1 (May), 1999, pp. 109-111.

"Best Practices for the Microsoft Mobile Internet Toolkit Image Control," Microsoft Corporation, Feb. 2002.

"Best Practices for Creating Adaptive User Interfaces with the Mobile Internet Toolkit," Microsoft Corporation, Jan. 2002.

"Best Practices for Creating Adaptive User Interfaces with the Mobile Internet Toolkit"; Microsoft Corporation, Jan. 2002; 15 pages.

"Best Practices for the Microsoft Mobile Internet Toolkit Image Control"; Microsoft Corporation, Feb. 2002.

"HTML Encyclopaedia"; http://www.scit.wlv.ac.uk/encyc/form.html; 2 pages.

Dowd, Tyson et al., "Compiling Mercury to the .NET Common Language Runtime," Electronic Notes in Theoretical Computer Sciences 59 No. 1 (Netherlands) (2001), pp. 1-16.

Hannay, Phillip et al., "MSIL For the .NET Framework: The Next Battleground?", Virus Bulletin Conference, Sep. 2001, pp. 173-196.

Holmes, John W.; e-Mail response to question regarding GET/POST. HTTP request, extracted from Google's News Groups, php.general, Nov. 11, 2002.

Hovanes, Michael E.; Deal, John R. Grizz; Rowberg, Alan H.; "Seamless Multiresolution Display of Portable Wavelet-Compressed Images" Journal of Digital Imaging, vol. 12, No. 2 suppl 1 (May), 1999, pp. 109-111.

Kunz, T.; El Shentenawy, M.; Gaddah, A..; Hafez, R.; Image Transcoding for Wireless WWW Access: The User Perspective; Multimedia Computing and Networking 2002, Proceedings of SPIE vol. 467 (2002) pp. 28-33.

Langheinrich, M., et al., "Unintrusive customization techniques for Web advertising," Computer Networks, vol. 31, No. 11-16. May 17, 1999, pp. 1259-1272.

Lee, C.-H., et al., "Web personalization expert with combining collaborative filtering and association rule mining technique," Expert Systems With Applications, Vo. 21, No. 3, Oct. 2001, pp. 131-137.

Li, W.-S., et al., "PowerBookmarks: a system for personalizable Web information organization, sharing, and management," Computer Networks, vol. 31, No. 11-16, May 17, 1999, pp. 1375-1389.

Mobasher, B., "A Web personalization Engine Based on User Transaction Clustering," Proc. Of the 9th Annual Workshop on Information Tech. And Systems, Dec. 11, 1999, pp. 179-184.

Nadamoto, Akiyo; Kondo, Hiroyuki; Tanaka, Katsumi; "WebCarousel: Restructuring Web Search Results for Passive Viewing in Mobile Environments" IEEE 2001 p. 164-165.

"NCSA httpd" nttpd@ncsa.uiuc.edu.

O'Leary, M., "Web personalization Does It Your Way," O'Leary Online, vol. 23, No. 2, Mar.-Apr. 1999, pp. 79-80.

Penn, Gerald; Hu Jianying; Luo, Hengbin; McDonald, Ryan; "Flexible Web Document Analysis for Deliver to Narrow-Bandwidth Devices"; IEEE 2001; pp. 1074-1078.

Pyarali, Irfan; O'Ryan, Carlos; Schmidt, Douglas; Wang, Nanbor; Gokhale, Aniruddha S.; Kachroo, Vishal; "Using Priciple Patterns to Optimize Real-Time ORB's" IEEE Concurrency, 2000, pp. 16-25.

Ramakrishnan, N., "PIPE: Web Personalization by Partial Evaluation," IEEE Internet Computing, vol. 4, No. 6, Nov.-Dec. 2000, pp. 21-31.

Seddon, Bill, "Generating XP Style webparts from a web control," The Code Project—Generating XP style webparts from a web control—ASP.NET, online at http://www.codeproject.com/aspnet/webpartscontrol.asp, retrieved Apr. 8, 2004, 10 pages.

Sells, Chris et al., "Generating Code at Run Time with Reflection. Emit," Windows Developer Magazine, Aug. 2002, vol. 13, No. 8, pp. 26-34.

Shi, Weisong; Collins, Eli; Karamcheti, Vijay; "Modeling Object Characteristics of Dynamic Web Content"; Proceedings of the IEEE Global Internet Conference, Nov. 2002, 5 pgs.

Syme, Don, "ILX: Extending the .NET Common IL for Functional Language Interoperability," Electronic Notes in Theoretical Computer Science 59 No. 1 (2001), pp. 1-20.

Varela, Carlos A.; Caroline C. Hayes; "Providing Data on the Web: From Examples to Programs," Second International WWW Conference, Chicago, IL; Oct. 17, 1994; 17 pages.

Wu, Dapeng; Hou, Yiwci Thomas-Zhang, Ya-Qin; "Scalable Video Transport over Wireless IP Networks"; IEEE 2000; pp. 1185-1191.

European Search Report for EP 02 00 5786.

Partial European Search Report for EP 02 00 5786.

Marc Abrams et al., "UIML: An XML Language for building Device-Independent User Interfaces," XML Conference Proceedings. Proceedings of XML, Dec. 1999, 15 pgs.

Flammia, G., "The Wireless Internet Today and Tomorrow," IEEE Intelligent Systems, [Online] vol. 15, Sep. 2000, pp. 82-83.

Abrams et al., "UIML an appliance-independent XML user interface language," Computer Networks, Elsevier Science Publishers B.V., Amsterdam, NL, vol. 31, No. 11-16, May 17, 1999, pp. 1695-1708.

Kaasinen Eija et al., "Two approaches to bringing internet services to WAP devices," Computer Networks and ISDN Systems, North Holland Publishing, Amsterdam, NL, vol. 33, No. 1, 2000, pp. 231-246.

"Spyglass Prism 3.1 Supports the latest Standards for Transmission of Content to Wireless Devices," Internet citation, Online!. Jul. 5, 2000, 3 pgs.

Muller-Wilken S. et al., "On integrating mobile devices into a workflow management scenario." Database and Expert Systems Applications, 2000. Proceedings 11$^{th}$ International Workshop on Sep. 4-8, 2000, Piscataway, NJ, USA, IEEE, pp. 186-190.

Davidson et al., "Schema for Object-oriented XML 2.0", Jul. 1999, W3 Consortium, pp. 1-29.

"Metadata Activity Statement," Feb. 2001, W3C.

"Metadata Activity Statement," http://web.archive.org/web/20000616163950/http://www.w3.org/Metadata/Activity.html, May 8, 2000, pp. 1-5.

"Web Services Description Language (WSDL)", Mar. 2001, W3C.

Aggarwal, Charu et al., "Caching on the World Wide Web" IEEE Transactions on Knowledge and Data Engineering, vol. 11, No. 1, Jan./Feb. 1999. pp. 94-107.

Alves Dos Santooa, L.M., "Multimedia Data and tools for Web services over Wireless Platforms," IEEE Personal Communications, Oct. 1998, pp. 42-46.

Ballinger, "Fun With SOAP Extensions," Mar. 2001, MSDN, pp. 1-5/.

Ciancarini et al., "An extensible rendering engine for XML and HTML," Computer Networks and ISDN System, North Holland Publishing. vol. 30, No. 1-7, Apr. 1998, pp. 225-237.

Davidson, et al., "Schema for Object-Oriented IML 2.0," Jul. 1999, W3Consortium, pp. 1-29.

Heins, et al., "Taking Your Information Into the Wireless World: Developing Information for Delivery to Mobile Devices," IEEE, pp. 237-244, Oct. 2001.

Howard, "Web Services with ASP.NET," Feb. 2001, MSDN, pp. 1-9.

Kagal, et al., "Centaurus: A Framework for Intelligent Services," Distributed Systems Group, IEEE, pp. 795-796, May 2001.

Kirda, "Web Engineering Device Independent Web Services," Distributed Systems Group, IEEE, pp. 195-201, Apr. 2001.

Krikelis, A., "Mobile multimedia: shapring the Inforverse," IEEE Concurrency, Jan.-Mar. 1999, ppl. 7-9.

Moore, M.M. et al., "Migrating legacy user interfaces to the internet: shifting dialogue initiative," IEEE, Nov. 23, 2000, pp. 52-58.

Platt, "Thunderclap, the Newsletter of Rolling Thunder Computing," dated to Aug. 2001, vol. 3, No. 2, pp. 1-18.

Ren, Robin, "Practical Active Server Pages Technique: Porting Windows CG1 Applications to ASP," Microsoft Interactive Developer, No. 10, pp. 89-98, ASCII Corporation, Nov. 18, 1998 (CSDB: Technical Journal in Japan 2000001200009).

W3C, Soap Version 1.2 Specification Jul. 9, 2001 Working Draft, Jul. 2001.

Yoshikawa, Kazuhiro et al., "Expanding a System via the Internet: Construction/Operation Points to be Considered: Exploring a Construction/Operation for Improving Reliability and Security," Nikkei Open Systems, No. 63, pp. 182-191, Nikkei Business Publications, Inc., Jun. 15, 1998 (CSBD: Technical Journal in Japan 199800933009).

Chapter 1 Introduction—"Java Script Language", Netscape Communications, Apr. 23, 2001.

Hannay, Phillip et al., "MSIL For the .NET Framework: The Next Battleground?", Virus Bulletin Conference, Sep. 2001, pp. 173-196.

Ingham, David B.; "W3Objects: A Distributed Object-Oriented Web Server" Object-Oriented Web Servers and data Modeling Workshop, Sixth International World Wide Web Conference, Apr. 7, 1997, Santa Clara, CA 4 pages.

Kaffe, "Server Side Java", Jan. 16, 2998.

Tuecke, "Microsoft Professional Developers Conference Summary", 1996.

Winer, Dave, "XMP RPC Specification", Jun. 15, 1999.

Office Action dated Nov. 17, 2004 in U.S. Appl. No. 09/999,565.

Final Office Action dated May 25, 2005 in U.S. Appl. No. 09/999,565.

Office Action dated Feb. 8, 2006 in U.S. Appl. No. 09/999,565.

Final Office Action dated Jul. 25, 2006 in U.S. Appl. No. 09/999,565.

Office Action dated Jan. 13, 2005 in U.S. Appl. No. 09/989,562.

Final Office Action dated Jul. 27, 2005 in U.S. Appl. No. 09/989,562.

Office Action dated Jul. 19, 2006 in U.S. Appl. No. 09/989,562.

Final Office Action dated Jan. 30, 2007 in U.S. Appl. No. 09/989,562.

Office Action dated Jul. 6, 2007 U.S. Appl. No. 09/989,562.

Office Action dated Dec. 21, 2004 U.S. Appl. No. 09/934,122.

Office Action dated Jun. 21, 2005 U.S. Appl. No. 09/934,122.

Final Office Action dated Dec. 19, 2005 U.S. Appl. No. 09/934,122.

Office Action dated Aug. 9, 2006 U.S. Appl. No. 09/934,122.

* cited by examiner

ADAPTIVE IMAGE FORMATTING CONTROL

FIELD OF THE INVENTION

Aspects of the present invention are directed generally to web site development and administration. More particularly, aspects of the present invention relate to a method for controlling the generation of an image at a server suitable for presentation on the display of a client device.

BACKGROUND

Web pages are often not properly formatted for presentation on every device on which they are to be displayed. In many cases, when displayed on the monitor of a desktop device, or even of a laptop, portions of the web page lie outside the image area of the display. A user must then scroll down or scroll right to view the masked images. Depending on the particular display device, scrolling can be required for each web page accessed. Alternatively, in some cases users may set the display settings to that which is most suitable for the display device connected, to thereby cause the entire image of a particular web page to fit within the display window of the client device. Such settings, however, will effect the display of every image presented to the user in every application employed at the client device, and often cause images to be distorted to such a degree that they become undesirable. Moreover, as images associated with different web pages may vary, selecting the display settings for one web page may not compensate for problems associated with the receipt of web pages of different sizes. As a result, web designers may be forced to manually format and store a different image for each different display device.

While display of web pages on desktop devices can cause inconvenience, the display of such pages in mobile applications can be extremely difficult. Mobile devices are often equipped with small screens having limited display capabilities. Screen size, available memory, processing speeds, and other factors may place limits on the capabilities of a given display. Because an application designer may choose to sacrifice certain of the display capabilities in favor of other capabilities, the variations in capabilities among mobile devices are great.

Accordingly, web developers may design a different web page for mobile applications than those requested by devices having enhanced display capabilities. Even where web pages are designed for mobile applications, because the display capabilities of mobile device vary greatly, the images of a single web page may not display satisfactorily on each different type of device. For example, while one mobile device may be configured to display images in GIF formatting, others may require JPEG compatibility, WBMP (wireless bitmapping), PNG (portable networks graphics), or other formatting standards. Each model of portable device may have different display capabilities, ranging from high resolution, relatively large size, color displays to those that can only display low resolution black and white images within an extremely limited display area. Even devices possessing similar capabilities may differ sufficiently such that an image designed for display on one device is distorted when displayed on the other.

Currently, web designers building web sites for display on a variety of devices, or other devices having less sophisticated displays, are often required to either store a single image for display on every type of display device, regardless of the compatibility of the image, or to store different images depending on the particular device requesting the web page for each image within the page. In the latter case, the web designer must select and/or modify a different version of a source image to generate a sufficient number of images for display on every client device.

FIG. 1 illustrates a conventional server 1 with a processor 4 and a memory 5. Memory 5 may include an image memory 6 for storing image files to be transmitted and displayed on a client device. Memory 5 may also store web applications and other forms of programming and/or data. As shown in FIG. 1, images I1-IM corresponding to component images of a single web page, are each stored in the memory 5 of the server 1. Server may receive a request from one or more client devices operating a browser or the like, the client devices, $10_A$-$10_N$, may include a camera $10_A$ with a display $11_A$, a personal data assistant $10_B$ with a display $11_B$, a wireless telephone $10_C$ with a display $11_C$, a flip-top cellular telephone $10_D$ with a display $11_D$, a desk-top computer $10_E$ with a display $11_E$, a lap-top $10_N$ with a display $11_N$, or any such computing device with a display that may request the web page. Because the images may not be suitable for presentation on each type of device or each device with differing imaging characteristics, multiple versions of the same image, $I1_A$-$I1_N$, for example, may be stored for transmission to each different type of client device. For example, each client devices $10_A$-$10_N$ requesting the web page may include a display $11_A$-$11_N$ with different capabilities or requiring different image processing for preparing images and converting the images into a form suitable for display. The large number of images stored for retrieval may consume a great deal of memory resources. Moreover, a different set of images must be stored for both mobile devices having less sophisticated displays as well as for those client devices having substantially greater display capabilities, such as desktop monitors and the like.

Moreover, current systems are inflexible. Unless the web page designer is able to anticipate the display capabilities of each new client device to come to market, the designer must update the list of available images with additional images, IM+1 for example, meeting the formats and/or other display characteristics of the latest devices. Additionally, when changes are made to images and/or the web page, including the wholesale replacement of the image, such changes must be made to each version of the image affected, $I1_A$-$I1_N$. Because a user may not know how many images selected for incorporation into a web page will fit within the display area of any given client device, the user may choose to conservatively estimate the lowest number of images capable of display, excluding images from the web site that might fit within the display area of some or all client devices.

Accordingly, an improved method and system is required for generating images of a web site. Thus, there is a need in the art for an improved method for developing a web page with images suitable for display on any device. In addition, there is a need in the art for a method for generating images that properly fit the image area of the display used by the client device. There is also a need in the art for a method of generating images that are composed of image data that is suitable for display on the client device consistent with the formatting and display capabilities of that device. A method is also needed for enabling a user to designate with certainty the images that are to be displayed at the client device.

SUMMARY

Aspects of the present invention provide a flexible and efficient method for rendering images for display at any client device. Some aspects of the present invention relate to generating an image with properties matching the display capabilities of the output device. Other aspects of the invention relate to generating an image or images having the appropriate size and format compatible with each client device, all from a single source image. Such dynamic generation of images facilitates the updating of each version of the source image. A change to the source image will be reflected in each version of the source image automatically generated by the adaptive image formatting control, without requiring updating of the individual versions stored in memory. Furthermore, an image suitable for display on client devices with requirements unknown to the web page developer at the time of initial web page construction may be generated automatically.

Further aspects of the invention involve establishing conversion characteristics for use in converting a source image into a form suitable for display on any client device. Still further aspects of the invention relate to dynamically generating an image suitable for display on a device consistent with the capabilities associated with the particular client device requesting the image and/or web page. Previewing of the effects on the image and its depiction with the display of a client device is also provided. As a result of dynamic generation and/or previewing, web designers may include with confidence the number of images that will accurately fit within the display area of each client device.

These and other features and aspects of the invention will be apparent upon consideration of the following detailed description of the drawings.

BRIEF DESCRIPTION OF THE DRAWINGS

The foregoing summary of the invention, as well as the following detailed description of the drawings, is better understood when read in conjunction with the accompanying drawings, which are included by way of example, and not by way of limitation with regard to the claimed invention.

DETAILED DESCRIPTION OF THE DRAWINGS

Web Page Development

Aspects of the present invention involve the development of a web page including images that conform to the display characteristics of the client device.

General Purpose Computer

Figure 1:
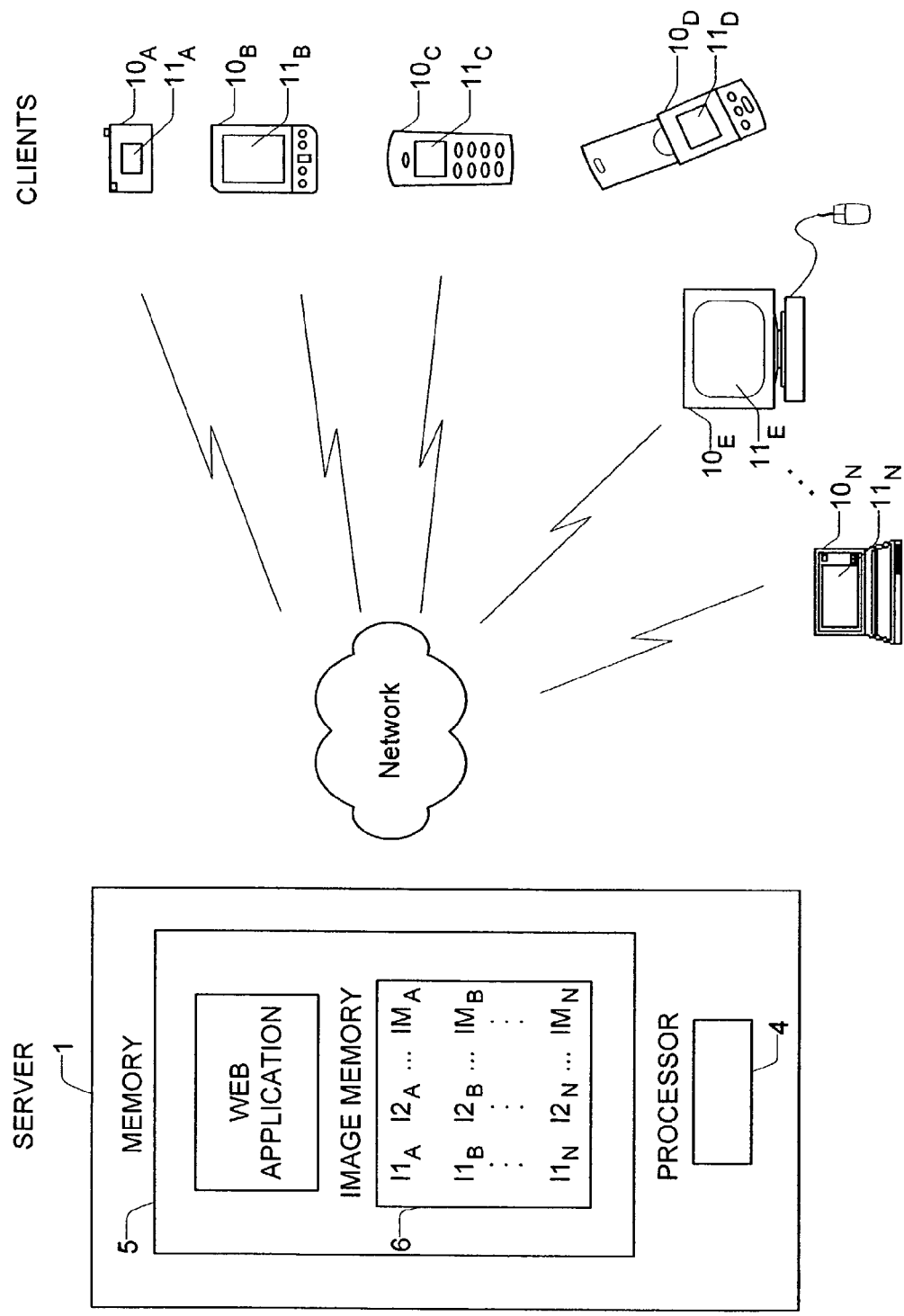
FIG. 1 shows a simplified depiction of a conventional server transmitting one of several stored versions of a source image to a client device requesting a web page.
Figure 2:
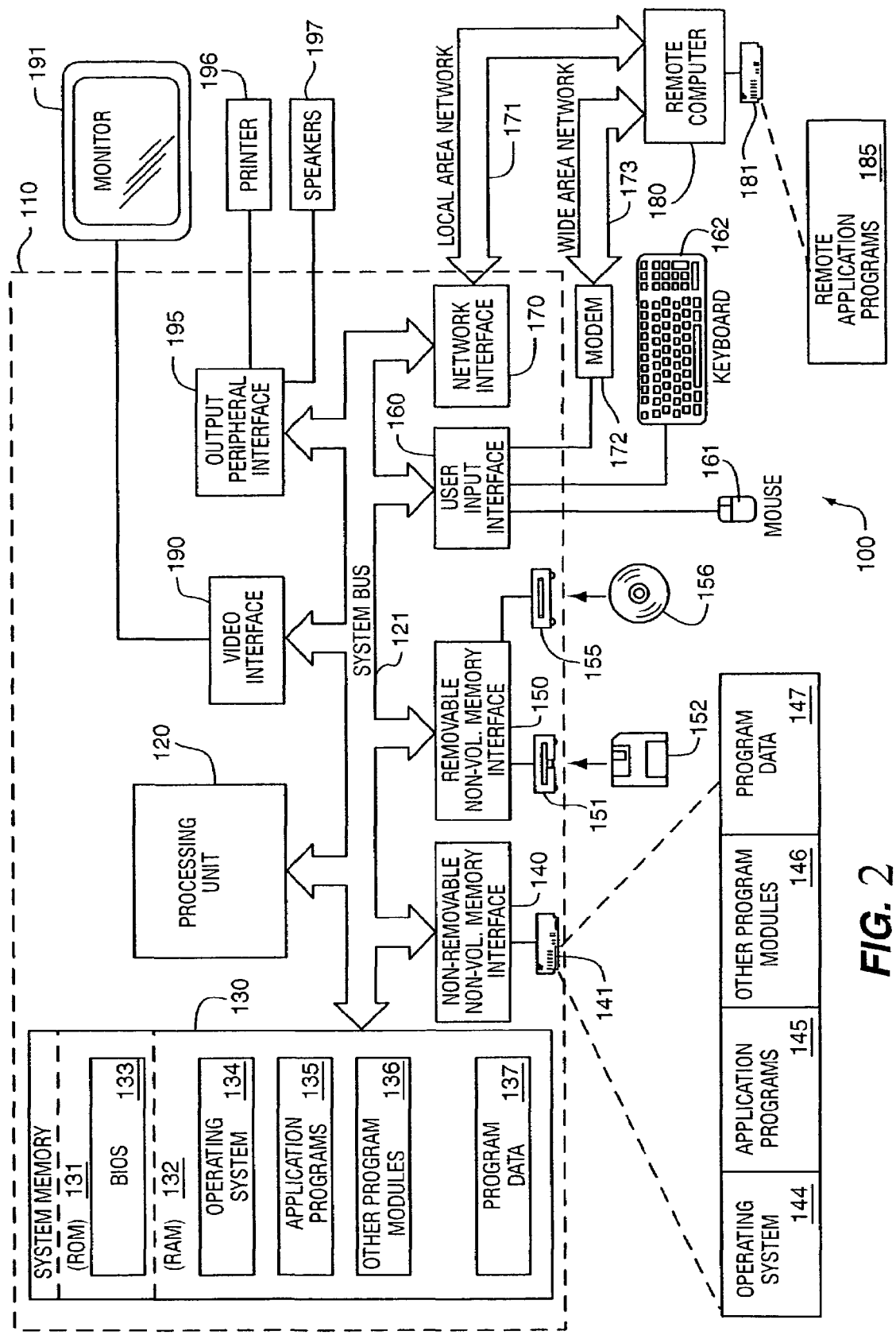
FIG. 2 shows a schematic diagram of a general-purpose digital computing environment that can be used to implement various aspects of the invention.

FIG. 2 illustrates a schematic diagram of an illustrative conventional general-purpose digital computing environment that can be used to implement various aspects of the present invention, both as a server and as a client device. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172, either hardwired or wireless, or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

It will be appreciated that the network connections shown are illustrative and other techniques for establishing a communications link between the computers can be used. The existence of any of various well-known protocols such as TCP/IP, Ethernet, FTP, HTTP, WAP, WAE and the like is presumed, and the system can be operated in a client-server configuration to permit a user to retrieve web pages from a web-based server. Any of various conventional web browsers can be used to display and manipulate data on web pages.

Using an adaptive formatting image control scheme, web designers may design web pages that properly fit within the image area of the display screen of the client device. The control method may be implemented in the form of a web development application.

Typically, web pages are built using toolkits such as the Mobile Internet Toolkit from MICROSOFT, which allows ASP.NET developers to create mobile web applications. The adaptive formatting image control functionality may be an application incorporated within the broader application, such as the mobile Internet toolkit described. Using the primary toolkit, the Mobile Internet Toolkit in this example, the web page developer may select the web site content. In the course of such selection, the user may choose to incorporate images including company logos, photographs, graphic images or any other image based data.

Having selected images for incorporation into the web site, adaptive formatting image control may be utilized to designate conversion characteristics for generating an image suitable for rendering on multiple client devices. The conversion characteristics may be selected to control scaling of the image. Scaling may be accomplished based on a percentage of the output screen width, height, or both. Scaling may also be performed to maintain the relative size of the source image and/or whether the aspect ratio of the image should be maintained. The position and orientation of the image may also be selected. The conversion characteristics may specify the location of the image relative to a portion of the display. For example, if the image is a banner and the user wishes to have the image displayed at the very top of the image area for each display device, that location can be specified for the image file containing the banner.

Color conversion techniques that might be used to convert a color image to match the color capabilities of a particular display device may also be selected. Furthermore, dithering techniques or other techniques for converting an image for presentation on a black and white device may be selected. As a further example, brightness of the image data may be selected to render an image more suitable for display. Of course, limits on any of the conversion characteristics may be set to insure that the image is modified without unacceptably distorting the image or otherwise modifying the image in an undesired manner. While the above conversion has been provided for purposes of example, any processing technique that might be desired for controlling the generation of an image for display may be incorporated within the present invention.

Figure 3:
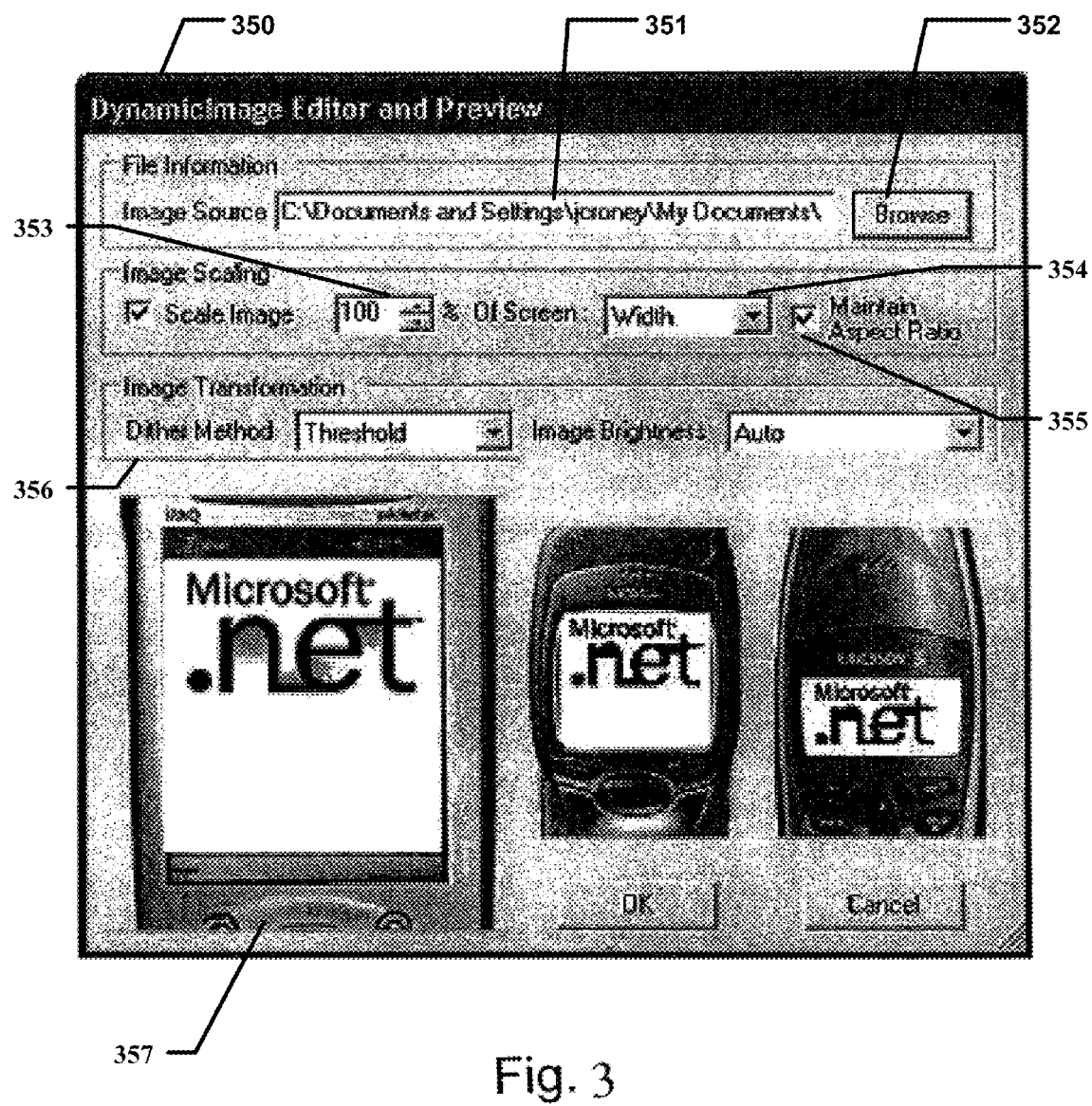
FIG. 3 shows a screen shot of an exemplary embodiment of the invention demonstrating the selection of conversion characteristics and previewing of representations of the impact of those selections.

FIG. 3 illustrates an exemplary embodiment of a dynamic image editor and preview screen 350 that a web designer might use according to the present invention for selecting image characteristics and previewing the effects of the selected characteristics on a few representative devices. In the embodiment illustrated, the image file source may be designated by typing in the string associated with the desired source file as depicted in the Image Source window 351. Alternatively, an image file of interest may be located using one of many searching techniques, such as a browse feature illustrated in FIG. 3 as in the form of a Browse button, 352. Of course, any technique for selecting an image may be used.

Conversion characteristics may be selected or entered in connection with the portions of the window illustrated in FIG. 3. Thus, using the editor, image scaling parameters may be designated by the web designer. In the illustrated example, image scaling is indicated with a designation of the percent of the screen width that the image is to occupy, entered in windows 353 and/or 354. Additionally, an instruction to "Maintain Aspect Ratio" may also be entered, as shown in window 355. Within the Image Transformation window 356, a technique for converting color values to color or grayscale values matching the display capabilities of the client device may be selected. For example, if the original image is in the form of 16 bit color values, but the display of the client device can only process 3-bit color data, an appropriate conversion would be performed by the processor within the server using a suitable conversion technique. FIG. 3 also depicts selection of a dither method for thresholding the image data within the Image Transformation window 356. In accordance with the illustrated embodiment, automatic image brightness control may also be selected. As previously described, any number of processing techniques may be implemented to transform data representing the image into data appropriate for display.

Representations of the effects of such designations on the source image, and the manner in which modified images are displayed on a select number of devices, may be presented to the user in a preview screen. In the exemplary embodiment illustrated in FIG. 3, the source image "Microsoft.net" is illustrated in window 357, as the image file might be modified and displayed on three different client devices. The preview screen includes representations of the displays of three portable telephones. Because each telephone has a different size display screen, the presentation of the image on each differs. As is obvious from the illustration, the image displayed on each screen is projected as having been scaled to fit 100% of the screen width, consistent with the image scaling parameters designated.

The types and number of image characteristics and conversion techniques available to the web developer are limitless. For example, rather than threshold the data for display on a black and white display, the image may be dithered using a matrix technique or the Floyd-Steinberg dithering technique for converting the image to grayscale data for appropriate display. Image characteristics may even be selected such that the image is not to be displayed on certain types of devices or if certain conditions exist. For example, where the web page includes numerous images, one designed for display on a large sized high resolution display for example, but the requesting client device can only display three small images satisfactorily, designation of a priority factor for each image at the time of web page development may be used to determine which of the source images will be displayed.

Conversion characteristics may also be set to default values. In one embodiment, characteristics for converting the image may be preselected to match the type of data contained within the image file, as might be indicated by the user, or by the file name extension, or by performing an image detection processing step, or otherwise. For example, a set of default conversion characteristics may be selected to appropriately modify images containing solely black and white data, while a different set of characteristics may be chosen for the conversion of images containing a number of colors and gradations of colors, as might be found in the photograph of a landscape, for example.

The formatting supporting the image file may also be used in selecting conversion characteristics for creating a modified image. For example, if the server determines that the client device supports GIF, JPEG, WBMP, PNG or other file formats, then the conversion characteristics corresponding to the individual properties of each format may be factored into the process for selecting conversion characteristics. Of course, determination of the format supported at the client device may impact the selection of conversion characteristics, may dictate the specific characteristics chosen, may effect selection of default values that may be modified by the user, or may be used in any manner that might impact display of the source image at the client computer.

Figure 4:
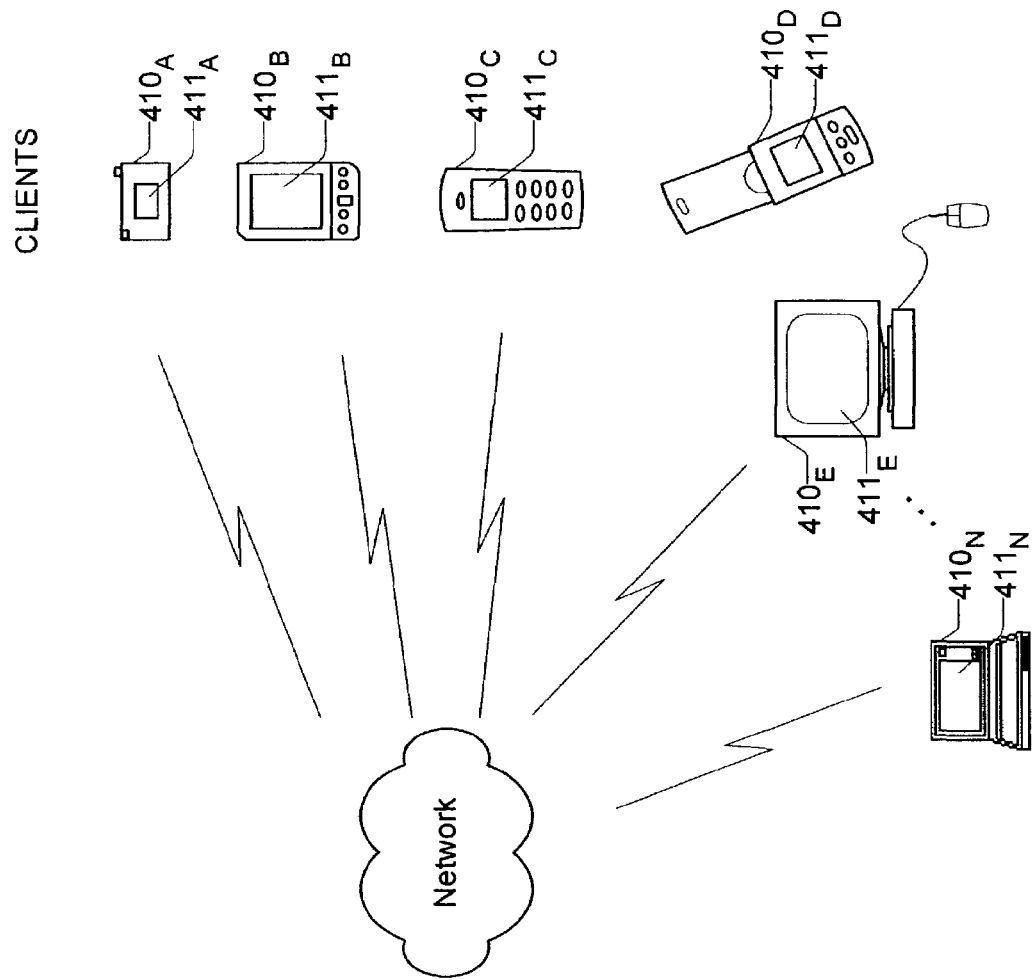
FIG. 4 shows a simplified depiction of a server incorporating aspects of the present invention for transmitting images to client devices requesting a web page.
Figure 4:
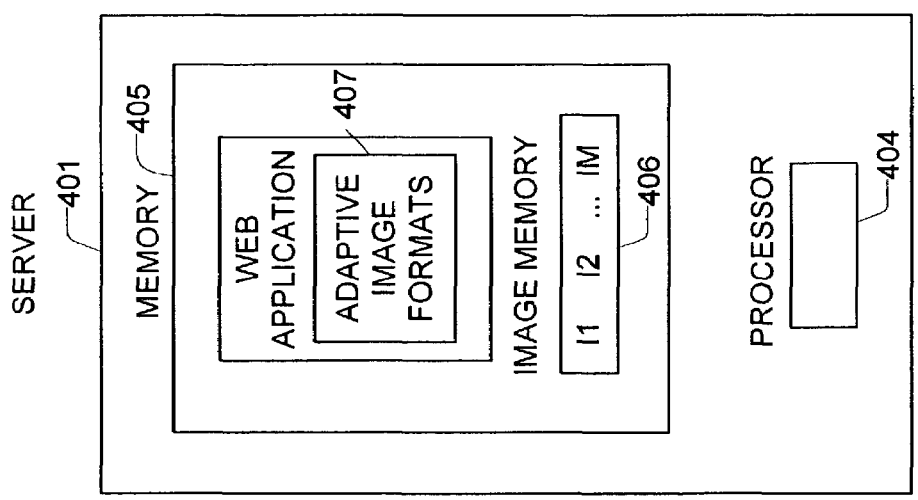

As shown in FIG. 4, a single image that is universally compatible with each display may be stored and used to generate images for transmission to various client devices $410_A$-$410_N$. Server D1 may also include a processor 404 and a memory 405, among other components not shown. Memory 405 may include an image memory 406 for storing image files to be transmitted and displayed on the display of a client device. Memory 405 may also store web applications and other forms of programming and/or data including the adaptive image formatting control program 407. As shown in FIG. 4, only images I1-IM corresponding to component images of a single web page, may be stored in memory 405. Modified versions of images I1-IM may be generated according to conversion characteristics, designated or otherwise, using processor 404, for example, to match the display capabilities of the recipient device. For example, each client device $410_A$-$410_N$ requesting the web page may include a display $411_A$-$411_N$ with different capabilities or requiring different image processing for preparing images and converting the images into a form suitable for display. The images may be stored for retrieval. Images I1-IM may be edited or otherwise changed, and a new version of each changed source image created automatically in response to requests by devices having capabilities for which no current image will be suitably displayed. As opposed to a system in which modified each image for display on every client device is created at the time of initial web page development, one change to the source image will affect a change to every version requested by the various client devices.

Where a single image cannot be used for generation of an image for each client device, a greater number of images may be generated at the time of web development and pre-stored and/or associated with conversion characteristics for display on a range of output devices.

Images may be identified during development, and/or editing, using the appropriate file name. Similarly, images may be loaded from other sources, such as other sites on the World Wide Web, and recreated at the server. Image profiles corresponding to the characteristics designations previously described may be created during initial development or in the course of editing the web page, stored separately with an identifier associating that file with an image file, stored with the image file as part of the image file, or otherwise.

Image Generation

Once customization of the image formatting characteristics has been completed, a server may implement the adaptive image formatting control to efficiently and effectively respond to requests for access to the web page from client devices with a diverse range of display capabilities.

HandHeld PC

Figure 5:
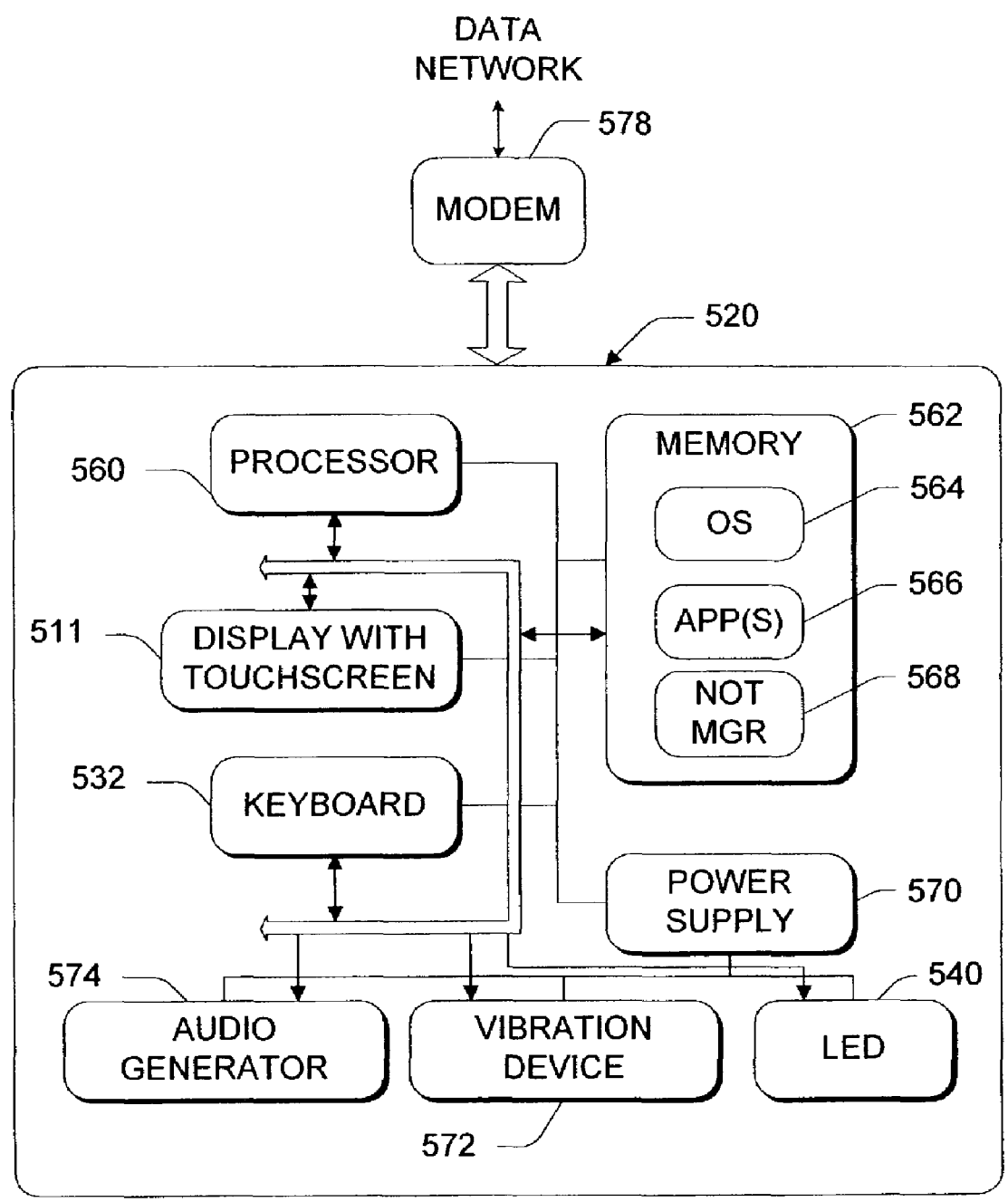
FIG. 5 shows an exemplary embodiment of a portable client device for use in accordance with embodiments of the present invention.

FIG. 5 shows functional components of the handheld computing device 520. It has a processor 560, a memory 562, a display 511, and a keyboard 532. The memory 562 generally includes both volatile memory (e.g., RAM) and non-volatile memory (e.g., ROM, PCMCIA cards, etc.). An operating system 564 is resident in the memory 562 and executes on the processor 560. The H/PC 520 includes an operating system, such as the Windows® CE operating system from Microsoft Corporation or another operating system.

One or more application programs 566 are loaded into memory 562 and run on the operating system 564. Examples of applications include email programs, scheduling programs, PIM (personal information management) programs, word processing programs, spreadsheet programs, Internet browser programs, and so forth. The H/PC 520 may also have a notification manager 568 loaded in memory 562, which executes on the processor 560. The notification manager 68 handles notification requests from the applications 566.

The H/PC 520 has a power supply 570, which may be implemented as one or more batteries. The power supply 570 might further include an external power source that overrides or recharges the built-in batteries, such as an AC adapter or a powered docking cradle.

The H/PC 520 is also shown with three types of external notification mechanisms: an LED 540, a vibration device 572, and an audio generator 574. These devices are directly coupled to the power supply 570 so that when activated, they remain on for a duration dictated by the notification mechanism even though the H/PC processor and other components might shut down to conserve battery power. The LED 540 preferably remains on indefinitely until the user takes action. The current versions of the vibration device 572 and audio generator 574 use too much power for today's H/PC batteries, and so they are configured to turn off when the rest of the system does or at some finite duration after activation.

The H/PC also has a modem 578 which provides dial-up access to the data network 578 to provide a back channel or direct link to the content servers 1. In other implementations of a back channel, the modem 578 might be replaced by a network card, or an RF receiver, or other type of port/receiver which provides access to the back channel. Alternatively, the H/PC may include a tuner for receiving content and/or programming.

Display 511 may include a high resolution display with the capability of displaying a wide range of colors from a large color pallet, as might be found in a POCKET PC having a pixel resolution of 240×320 and the ability to display 16-bit color data, or better. The hand held device may include technology suitable only for the display of black and white data on a small, extremely low resolution display, such as one including a 40 by 20 pixel display area. Of course, the display capabilities of the H/PC may vary greatly and image conversion may be designed to convert an image for display on the display on any hand-held device.

Devices may also be added for use with the handheld device, as known to one of ordinary skill. In one embodiment, the portable device may be connected to a full-scale keyboard and desktop sized monitor. Where the additional components are connected, such features may be indicated using applications incorporated within the handheld device.

Broadcast PC

Figure 6:
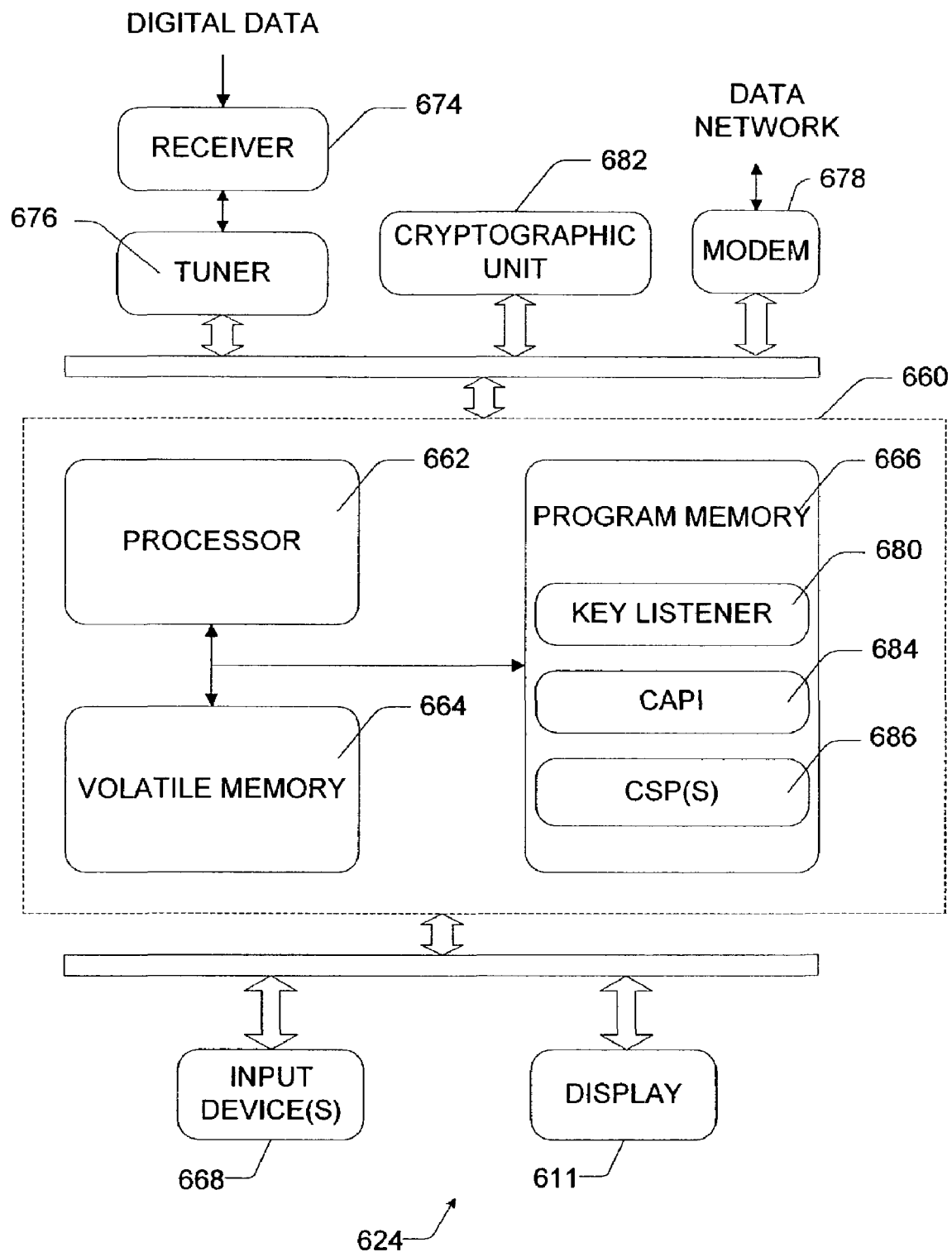
FIG. 6 shows an exemplary embodiment of a yet another client device for use in accordance with embodiments of the present invention.

In an alternative embodiment, the client device may include a desktop computer, laptop computer, Tablet PC, or other device with a large area high-resolution display. FIG. 6 shows an exemplary configuration of an authorized client 624 implemented as a broadcast-enabled computer. It includes a central processing unit 60 having a processor 662, volatile memory 664 (e.g., RAM), and program memory 666 (e.g., ROM, Flash, disk drive, floppy disk drive, CD-ROM, etc.). The client 624 has one or more input devices 668 (e.g., keyboard, mouse, etc.), and a computer display 611.

Display 611 may be any form of display device including a SVGA CRT monitor, a flat-screen display, an LCD display built into a laptop or other display. In one example, the display device may perform at a resolution of 1028 by 768 pixels. The display may be capable of displaying 16-bit color data, or other forms of color data associated with enhanced color display device. Of course, any form of display device may be included in the system in place of display 611 or in addition to that display.

The client 624 includes a digital broadcast receiver 674 (e.g., satellite dish receiver, RF receiver, microwave receiver, multicast listener, etc.) and a tuner 676 which tunes to appropriate frequencies or addresses of the broadcast network. The tuner 676 is configured to receive digital broadcast data in a particularized format, such as MPEG-encoded digital video and audio data, as well as digital data in many different forms, including software programs and programming information in the form of data files. The client 624 also has a modem 678 which provides dial-up access to the data network to provide a back channel or direct link to the content servers 622. In other implementations of a back channel, the modem 678 might be replaced by a network card, or an RF receiver, or other type of port/receiver which provides access to the back channel.

The client 624 runs an operating system which supports multiple applications. The operating system is preferably a multitasking operating system which allows simultaneous execution of multiple applications. The operating system employs a graphical user interface windowing environment which presents the applications or documents in specially delineated areas of the display screen called "windows." One preferred operating system is a Windows® brand operating system sold by Microsoft Corporation, such as Windows® 95 or Windows® NT or other derivative versions of Windows®.

It is noted, however, that other operating systems which provide windowing environments may be employed, such as, but not limited to, the Macintosh operating system from Apple Computer, Inc. and the OS/2 operating system from IBM.

The client 624 is illustrated with a key listener 680 to receive the authorization and session keys transmitted from the server. The keys received by listener 680 are used by the cryptographic security services implemented at the client to enable decryption of the session keys and data. Cryptographic services are implemented through a combination of hardware and software. A secure, tamper-resistant hardware unit 682 is provided external to the CPU 660 and two software layers 684, 686 executing on the processor 662 are used to facilitate access to the resources on the cryptographic hardware 682.

The software layers include a cryptographic application program interface (CAPI) 84 which provides functionality to any application seeking cryptographic services (e.g., encryption, decryption, signing, or verification). One or more cryptographic service providers (CSPs) 686 implement the functionality presented by the CAPI to the application. The CAPI layer 84 selects the appropriate CSP for performing the requested cryptographic function. The CSPs 686 perform various cryptographic functions such as encryption key management, encryption/decryption services, hashing routines, digital signing, and authentication tasks in conjunction with the cryptographic unit 682. A different CSP might be configured to handle specific functions, such as encryption, decryption, signing, etc., although a single CSP can be implemented to handle them all. The CSPs 686 can be implemented as dynamic linked libraries (DLLs) that are loaded on demand by the CAPI, and which can then be called by an application through the CAPI 684.

As the description suggests, client 624 is described as including a digital broadcast receiver 674 and a tuner 676. However, client 624 may not require such components. Thus, while client 624 may correspond to a mobile device equipped with such features, such as a portable telephone, personal data assistant, a camera, a lap-top computer, tablet PC, or other device capable of performing wireless internet access, client 624 may not be so limited. The present invention is similarly applicable to desk-top and other applications for which portability is not a concern.

Figure 7:
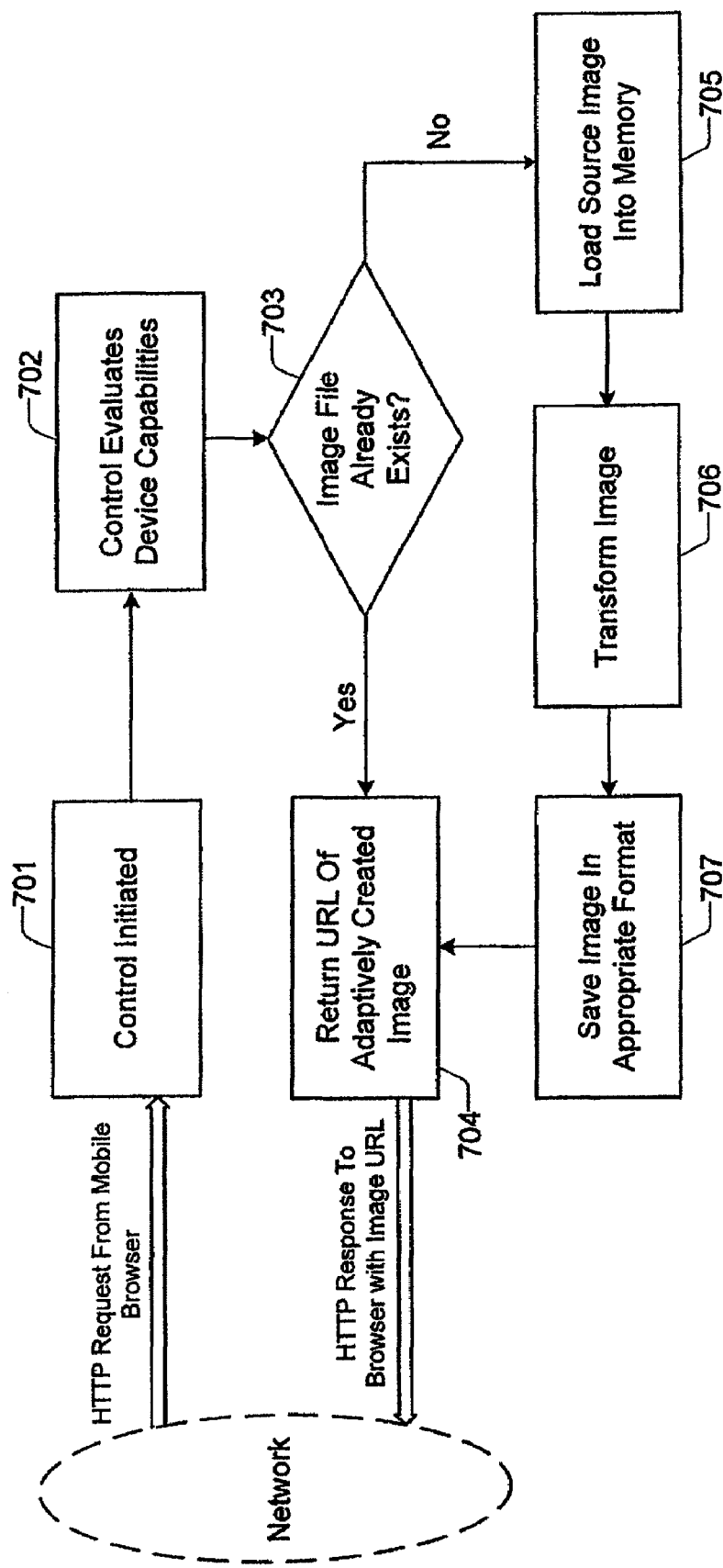
FIG. 7 shows a simplified depiction of an exemplary method for selecting an image for transmission to a browser.

FIG. 7 illustrates a simplified embodiment of one exemplary method for generating an image for transmission to a client device. As shown in step 701, adaptive image formatting control may initiate upon receipt by the server of a marked-up language page request from a browser operating on a client device. In step 702, the display capabilities associated with the client device may be determined. Using information corresponding to the display capabilities of the client device, the control module or processor determines whether an image suitable for display on the client device has been stored in memory, step 703. If such an image has been stored, as shown in step 704, the server may transmit the URL of that file to the browser, for example until the browser automatically requests transmission of the file. Upon request, the stored image may be transmitted.

If an image suitable for presentation at the client device does not currently exist, then the server may generate such an image in steps 705-707. As shown in step 705, the server may retrieve the source image and load it into memory for processing. Applying conversion characteristics based on the device capabilities determined previously at step 702, the image is converted into a format suitable for display at the client device at step 706. Thus, the image may be modified prior to transmission. As noted, the modified image may be generated by scaling the source image to meet any number of criteria, such as to fit within the display area of the client device. The image may also be modified to convert the image data into color data presentable on the display of the output device, or by converting the color data of a source image into dithered or other grayscale data, or by reducing the amount of data used to represent the image, or otherwise. The brightness of the image may also be adjusted. The modified image may then be stored, or cached, at step 707, and an identifier may be added to the list of available images for transmission to client devices with corresponding display characteristics in response to future requests from such devices. Alternatively, no image other than the source image may be stored in the memory of the server and a new version of the source image can be generated each time a request is received that requires a modified image.

In some cases, the source image may constitute a suitable image for immediate transmission to a client device, without having to generate a modified image. Thus, the source image may be transmitted to a client device without modification.

The performance characteristics of the display of the client device may be determined via any number of methods. In accordance with some http or other marked-up language protocols, the client device may provide information from which the server may determine the display capabilities of the client device. For example, within the header of the initial page request, the browser operating on the client device may incorporate data identifying the model of the client device and/or various capabilities of the client device, including the pixel resolution of the screen, the screen depth, the number of characters displayable on the screen, and many others. The server may use this information to determine the performance characteristics associated with the client device. Where the device capabilities are previously known to the server, the identity of the client device may be used to look up the device capabilities for that unit, or otherwise used to retrieve the display characteristics of the client device. In another example, the client device might provide a device profile describing its capabilities. In a further example, the client device may provide a link to a web site that the server may access to retrieve information describing the capabilities of the client device. Of course, any method for which the display capabilities may be useful in providing an appropriate image for display may be utilized. For example, the server may query the client device for information regarding the display capabilities of the client device. The browser may include a procedure for interrogating the client device or the user for information describing the display capabilities associated with that device. For example, where the client device includes an external display device, such as a monitor connected to the client device as a primary or secondary display, the user may be prompted to identify the device or its capabilities.

While embodiments of the present invention have been described in the context of conversion of image data to match the capabilities of equal or less sophisticated displays as those that might be found on portable devices, such as mobile telephones, conversion in any manner to improve displayability of an image on a client device is well within the scope of the present invention. Thus, conversion of the source image data into a higher resolution or more complex format is well within the scope of the invention. Thus, conversion techniques such as interpolation or others for enhancing the resolution, quality, amount of data, or otherwise producing a more desirable image for display, with which the source image is represented when presented on the display of the client device is within the scope of the present invention. For example, color-processing techniques may be employed to increase the number of colors that might be used to represent the source image when displayed on the client device.

Although the invention has been defined using the appended claims, these claims are illustrative in that the invention is intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations. For instance, in various embodiments, a certain order to the data has been shown. However, any reordering of the data is encompassed by the present invention. Also, where certain units of properties such as size (e.g., in bytes or bits) are used, any other units are also envisioned.

We claim:

1. A method executable on a computer for generating an image, comprising:
    a web application designating conversion characteristics at a server device, the conversion characteristics being associated with characteristics of a plurality of different mobile client devices, wherein the conversion characteristics indicate at least one of a scale factor for an image in relation to a dimension of a mobile client device's display, an indication for maintaining an aspect ratio of the image, and a dither method applied to the image;
    the web application designating a priority factor for the image, wherein the priority factor indicates whether the requested image will be displayed on the mobile client device before each of a plurality of other images;
    receiving a request for a web page at the server device from a browser operating on the mobile client device, wherein the web page is created by the web application and the web page includes the image;
    the server device determining the display characteristics of the mobile client device from the request, wherein the request includes a header with information indicating display characteristics of the mobile client device; and
    the server device modifying an image file corresponding to the image for generating an image suitable for rendering on the display of the mobile client device in accordance with the display characteristics of the mobile client device and the conversion characteristics.

2. The method according to claim 1 further including storing the image suitable for rendering on the display of the mobile client device in memory.

3. The method according to claim 2 further including:
    determining if an image file suitable for display on a mobile client device has been generated; and
    if a suitable image file has been generated, retrieving from memory the generated image file for transmission to the mobile client device.

4. The method according to claim 1 wherein determining the display characteristics of the mobile client device includes receiving information identifying the mobile client device.

5. The method according to claim 1 wherein modifying the image file includes converting the image file into a format compatible with the image format of the mobile client device.

6. The method according to claim 5 wherein the image file may be converted into a format compatible with WBMP or PNG formats.

7. The method according to claim 1 wherein modifying the image file includes scaling the image to a size appropriate for display on the display of the mobile client device.

8. The method according to claim 1 wherein modifying the image file includes converting the image so that the displayed image occupies a specified amount of the display area of the display of the mobile client device.

9. The method according to claim 1 wherein modifying the image file includes converting the colors of the image into colors for display on the mobile client device.

10. The method according to claim 1 wherein modifying the image file includes converting the colors of the image into a monochromatic image.

11. The method according to claim 1 wherein modifying the image file includes converting a color image into a grayscale image.

12. The method according to claim 1 wherein modifying the image file includes converting the brightness of the image.

13. The method according to claim 1 wherein the mobile client device includes a laptop.

14. The method according to claim 1 wherein the mobile client device includes a display with limited display capabilities.

15. The method according to claim 1 further including transmitting the image file suitable for rendering on the display of the mobile client device to the mobile client device.

16. The method of claim 1, wherein the priority factor indicates whether the requested image will be displayed on the mobile device before each of the plurality of requested images when the mobile client device is incapable of displaying the requested image and the plurality of requested images simultaneously.

17. A computer storage medium storing computer executable instructions that when executed perform a method comprising:
    a web application designating conversion characteristics at a server device, the conversion characteristics being associated with characteristics of a plurality of different mobile client devices wherein the conversion characteristics indicate at least one of a scale factor for a requested image in relation to a dimension of a mobile client's display, an indication for maintaining an aspect ratio of the requested image, and a dither method applied to the requested image;
    the web application designating a priority factor for the requested image, wherein the priority factor indicates whether the requested image will be displayed on the mobile client device before each of a plurality of requested images;
    the server device receiving a request for a web page from a browser operating on a mobile client device including a display, the request including a header with information indicating display characteristics of the mobile client device, wherein the web page is created by the web application and the web page includes the requested image;
    in response to receiving the request, the server device determining if an image file of the image suitable for display on the mobile client device has been generated;
    if a suitable image file has been generated, retrieving the image file; and
    if a suitable image file has not been generated, the server device modifying an image file corresponding to the image according to the conversion characteristics to generate an image suitable for rendering on the display of the mobile client device.

18. The computer storage medium according to claim 17 further including storing the modified image in memory.

19. The computer storage medium according to claim 17 wherein the request includes receiving information identifying the mobile client device.

20. The computer storage medium according to claim 17 wherein modifying the image file includes converting the image file into a format compatible with the mobile client device.

21. The computer storage medium according to claim 17 wherein modifying the image file includes scaling the image.

22. The computer storage medium according to claim 17 wherein modifying the image file includes performing color image processing.

23. The computer storage medium according to claim 17 wherein modifying the image file includes converting the image into a grayscale image.

24. The computer storage medium according to claim 17 wherein the mobile client device includes a laptop.

25. The computer storage medium according to claim 17 wherein the mobile client device includes a display with limited display capabilities.

26. The computer storage medium according to claim 17 further including transmitting the modified image file to the mobile client device.

27. The method of claim 17, wherein the priority factor indicates whether the requested image will be displayed on the mobile client device before each of the plurality of requested images when the mobile client device is incapable of displaying the requested image and the plurality of requested images simultaneously.

28. A server device for generating an image, the server device comprising:
   computer storage media storing:
      a web application designating conversion characteristics at the server device, the conversion characteristics being associated with characteristics of a plurality of different client devices, wherein the conversion characteristics indicate at least one of a scale factor for an image in relation to a dimension of a client's display, an indication for maintaining an aspect ratio of the image, and a dither method applied to the image, the web application further designating a priority factor for the image, wherein the priority factor indicates whether the image will be displayed on the client device before each of a plurality of requested images; and
      computer executable instructions that when executed perform a method comprising:
         receiving a request for a web page at the server device from a browser operating on the client device, wherein the web page is created by the web application and the web page includes the image;
         in response to receiving the request, the server device determining imaging characteristics of the client device using the request, wherein the request includes a header with information indicating imaging characteristics of the client device;
         the server device converting an image file corresponding to the image in accordance with the imaging characteristics of the client device and the conversion characteristics to generate a converted image file; and
         storing the converted image file in memory; and
      a processor for executing the computer executable instructions.

29. The server device according to claim 28 further including retrieving the converted image file in response to a request from a browser operating on a second client device.

30. The server device according to claim 28 wherein converting an image file includes selecting an image file, from a plurality of image files, based on the imaging characteristics of the client device for conversion into a form suitable for display at the client device.

31. The server device according to claim 28 further including:
   determining if an image file suitable for processing on a client device has been stored in memory; and
   if an image file suitable for processing on a client device has been stored in memory, retrieving the stored image file for transmission to the client device.

32. The server device according to claim 28 wherein determining the imaging characteristics of the client device includes determining the image formats processed by the client device.

33. The server device according to claim 28 wherein determining the imaging characteristics of the client device includes determining the display characteristics of the client device.

34. The server device according to claim 28 wherein converting an image file includes scaling the image.

35. The server device according to claim 34 wherein scaling the image includes converting the image to fit within a designated portion of the image area of the display of the client device.

36. The server device according to claim 34 wherein scaling the image includes converting the image to occupy a designated amount of the image area of the display of the client device.

37. The server device according to claim 28 wherein converting an image file includes performing color processing.

38. The server device according to claim 28 wherein converting an image file includes converting a color image into a grayscale image.

39. The method of claim 28, wherein the priority factor indicates whether the requested image will be displayed on the client device before each of the plurality of requested images when the client device is incapable of displaying the requested image and the plurality of requested images simultaneously.

40. A method executable on a computer for controlling the generation of an image, comprising:
   a web application designating a first set and a second set of conversion characteristics at a server device, the first set of conversion characteristics being associated with characteristics of a first client device and the second set of conversion characteristics being associated with characteristics of a second client device, wherein the first set of conversion characteristics indicate at least one of a scale factor for a requested image in relation to a dimension of the first client's display, an indication for maintaining an aspect ratio of the requested image, and a dither method applied to the requested image, and wherein the second set of conversion characteristics indicate at least one of a scale factor for the requested image in relation to a dimension of the second client's display, a second indication for maintaining the aspect ratio of the requested image, and a second dither method applied to the requested image;

the web application designating a priority and factor for the requested image, wherein the priority factor indicates whether the requested image will be displayed on the first client device, and the second client device before each of a plurality of requested images;

receiving a request for a web page at the server device from a browser, the request includes a header with information indicating display characteristics of a client devices, wherein the web page is created by the web application and the web page includes the requested images; and in response to receiving the request, the server device determining that the client device is the first client device and generating an image corresponding to the requested image suitable for rendering on the first client's display of the client device according to the first set of conversion characteristics and the display characteristics.

41. The method according to claim 40 wherein the first client device is a mobile unit.

42. The method according to claim 40 wherein the first client device is a mobile unit with limited display capabilities.

43. The method according to claim 40 wherein the first client device is a desk-top unit.

44. The method according to claim 40 wherein designating a first set and a second set of conversion characteristics includes specifying a brightness factor for the first client device and the second client device.

45. The method according to claim 40 wherein designating a first set and a second set of conversion characteristics includes specifying conversion in accordance with a universally displayable image profile.

46. The method according to claim 40 further including previewing the effects of designated conversion characteristics on the image.

47. The method according to claim 40 further including modifying one of the first set or the second set of conversion characteristic.

48. A computer readable recording medium incorporating the method as recited in claim 40.

49. The method of claim 40, wherein the priority factor indicates whether the requested image will be displayed on the client device before each of the plurality of requested images when the client device is incapable of displaying the requested image and the plurality of requested images simultaneously.

* * * * *